United States Patent [19]

Fujita et al.

[11] Patent Number: 4,521,586
[45] Date of Patent: Jun. 4, 1985

[54] PROCESS FOR PREPARING HIGH MOLECULAR WEIGHT COMPOUNDS

[75] Inventors: Takeshi Fujita; Shigeo Mori, both of Kyoto; Hironori Kataoka, Yamatokoriyama; Akira Taniuchi, Kyoto, all of Japan

[73] Assignee: Dai-Ichi Kogyo Seiyaku Co., Ltd., Kyoto, Japan

[21] Appl. No.: 476,155

[22] Filed: Mar. 17, 1983

[30] Foreign Application Priority Data

Mar. 17, 1982 [JP] Japan .................................. 57-43340
Apr. 13, 1982 [JP] Japan .................................. 57-62164

[51] Int. Cl.³ ...................... C08G 63/42; C08G 63/66; C08G 59/00
[52] U.S. Cl. .................................. 528/297; 528/301; 528/405
[58] Field of Search .................. 528/297, 301, 405

[56] References Cited

U.S. PATENT DOCUMENTS 2,687,430  8/1951  Snow et al. ........................ 528/301
3,293,193  12/1966  Krahler et al. ..................... 528/405
3,723,390  3/1973  Carpenter et al. ................. 528/297

OTHER PUBLICATIONS

J. Furukawa et al., Polymerization of Aldehydes and Oxides, Interscience Publishers, pp. 130–141, 1963.

Primary Examiner—John Kight
Assistant Examiner—Kriellion Morgan
Attorney, Agent, or Firm—Armstrong, Nikaido, Marmelstein & Kubovcik

[57] ABSTRACT

A process for preparing polyoxyalkylene high molecular weight compounds having an average molecular weight of more than 20,000 and being soluble in solvents and moldable by addition-polymerizing ethylene oxide alone or a mixture of alkylene oxides containing ethylene oxide to an organic compound having at least 2 active hydrogen groups to produce a polyhydroxyl compound having an average molecular weight of not less than 1,000, and esterifying the polyhydroxyl compound with a polycarboxylic acid, its anhydride or its lower alkyl ester.

7 Claims, No Drawings

PROCESS FOR PREPARING HIGH MOLECULAR WEIGHT COMPOUNDS

BACKGROUND OF THE INVENTION

The present invention relates to a process for preparing a high molecular weight compound which is soluble in solvents and moldable and has an average molecular weight of more than 20,000.

Hitherto, polyoxyalkylene high molecular weight compounds having an average molecular weight of not less than 20,000 have been prepared by, for instance, as represented by polyethylene oxide, polymerizing an alkylene oxide such as ethylene oxide in the presence of a special catalyst such as diethylzinc, strontium carbonate or triethylaluminum under a special polymerization condition (e.g. in a solvent such as n-hexane, 1,4-dioxane or n-heptane. However, in such a conventional process, the solvent is indispensible for promoting the polymerization, and a step for removing the solvent such as distillation is required for taking out the product after the completion of the polymerization. Also, since a metal ion such as $Zn^{2+}$ or $Al^{3+}$ of the metal compound used as a catalyst remains in the so obtained product, it causes a problem upon using the product in various purposes such as a binder for granular agricultural chemicals and a binder for use in inorganic industry.

On the other hand, it is known to prepare water-soluble high molecular weight compounds (polyester resins) by esterifying a relatively low molecular weight polyalkylene glycol used as a glycol component with a dicarboxylic acid such as maleic acid or succinic acid or its derivative. However, in this process, it is necessary to control the content of the polyalkylene glycol low for producing the high molecular weight compounds. For this reason, the product has been merely employed in limited purposes, e.g. modification of polyester fibers.

It is an object of the present invention to provide novel polyoxyalkylene high molecular weight compounds which are soluble in solvents and moldable, and are usable in many purposes.

Another object of the invention is to provide a process for preparing polyoxyalkylene high molecular weight compounds which are soluble in solvents and moldable, and are usable in many purposes.

These and other objects of the present invention will become apparent from the description hereinafter.

SUMMARY OF THE INVENTION

In accordance with the present invention, there is provided a process for preparing a high molecular weight compound which comprises addition-polymerizing an alkylene oxide containing ethylene oxide to an organic compound having at least 2 active hydrogen groups to produce a polyhydroxyl compound having an average molecular weight of not less than 1,000, and esterifying said polyhydroxyl compound with an esterifying agent selected from the group consisting of polycarboxylic acids, anhydrides thereof and lower alkyl esters thereof by means of esterification or interesterification reaction to produce a high molecular weight compound which has an average molecular weight of more than 20,000 and is soluble in solvents and moldable.

DETAILED DESCRIPTION

The term "active hydrogen group" as used herein means a group having active hydrogen, e.g. alcoholic hydroxyl group, amino group and phenolic hydroxyl group.

Typical examples of the organic compound having at least 2 active hydrogen groups are, for instance, ethylene glycol, diethylene glycol, propylene glycol, dipropylene glycol, 1,4-butanediol, 1,6-hexanediol, neopentyl glycol, bisphenol A, polyethylene glycol, polypropylene glycol, polytetramethylene glycol, aniline, butylamine, octylamine, laurylamine, cyclohexylamine, glycerin, trimethylolpropane, pentaerythritol, diglycerin, tris(2-hydroxyethyl)isocyanurate, dipentaerythritol, sorbitol, sucrose, monoethanolamine, diethanolamine, triethanolamine, isopropanolamine, ethylenediamine, diethylenetriamine, triethylenetetramine, tetraethylenepentamine, polyethyleneimine, tolylenediamine, diaminodiphenylmethane, novolak resin, aniline resen, and the like.

In the present invention, an alkylene oxide containing ethylene oxide is first addition-polymerized to an organic compound having at least 2 active hydrogen group (as a starting material) to produce a polyhydroxyl compound having an average molecular weight of at least 1,000. For instance, in case of employing a polyhydric alcohol as a starting material, a polyalkylene glycol ether is produced.

The addition polymerization is carried out, preferably in the presence of an alkali metal hydroxide as a catalyst such as sodium hydroxide or potassium hydroxide, at a temperature of about 90° to about 200° C. for about 2 to about 30 hours. This reaction does not particularly require the use of a solvent and, therefore, according to the process of the invention a step for removing a solvent can be omitted.

The alkylene oxide to be subjected to the polymerization is ethylene oxide alone or a mixture of alkylene oxides containing ethylene oxide as an essential component. The alkylene oxides other than ethylene oxide include, for instance, propylene oxide, butylene oxide and styrene oxide. The content of ethylene oxide in the mixture of alkylene oxides is usually not less than 30% by weight, preferably not less than 50% by weight. The organic compound having at least 2 active hydrogen groups is employed in an amount of about 0.1 to about 20 parts by weight per 100 parts by weight of the alkylene oxides. The amount of the catalyst is selected from 0.01 to 1 part by weight per 100 parts by weight of the whole reactants, namely 100 parts by weight of the total of the alkylene oxides and the organic compound having at least 2 active hydrogen groups.

Since the reaction mixture obtained by the polymerization does not contain a solvent and the alkali metal hydroxide used as a catalyst also serves as a catalyst for the esterification in the next step, it is used for the next step as it is without being treated.

The polyhydroxyl compound obtained by the above-mentioned method is then subjected to esterification or interesterification reaction by employing polycarboxylic acids, anhydrides thereof or lower alkyl esters thereof as an esterifying agent, thereby producing a high molecular weight compound having an average molecular weight of more than 20,000, preferably not less than 30,000, more preferably not less than 50,000, and being soluble in solvents and moldable.

The esterification or interesterification reaction is carried out by adding an esterifying agent such as polycarboxylic acid, its anhydride or its lower alkyl ester to the polyhydroxyl compound, elevating the temperature, and conducting dehydration or dealcoholization reaction at a temperature of 80° to 250° C. under a reduced pressure of 0.001 to 20 mmHg usually for 30 minutes to 10 hours. The amount of the esterifying agent is from 0.5 to 5.0 moles per mole of the polyhydroxyl compound.

Examples of the esterifying agent used in the present invention are, for instance, polycarboxylic acids such as malonic acid, succinic acid, maleic acid, fumaric acid, adipic acid, sebacic acid, phthalic acid, isophthalic acid, terephthalic acid, itaconic acid, trimellitic acid, pyromellitic acid and dimer acid, lower alkyl esters of the above-mentioned polycarboxylic acids such as the monomethyl esters, dimethyl esters, monoethyl esters, diethyl esters, monopropyl esters, dipropyl esters, monobutyl esters and dibutyl esters, and anhydrides of the above-mentioned polycarboxylic acids.

The process of the present invention has the following features as compared with conventional processes for preparing a polyoxyalkylene high molecular weight compound having an average molecular weight of at least 20,000.

(1) A conventional process for preparing a polyoxyalkylene high molecular weight compound in one stage requires a long time in preparing the high molecular weight compound having a molecular weight of hot less than 20,000. On the other hand, according to the process of the present invention, since a polyhydroxyl compound having a relatively low molecular weight is prepared in the first step and then esterified in the second step and these both reactions are relatively promptly completed, the product having a molecular weight of more than 20,000 can be obtained in a shortened period of time.

(2) The process of the invention does not require the use of a solvent in both of the first and second steps, and accordingly a step for removing a solvent as required in a conventional process can be omitted.

(3) The high molecular weight compounds obtained by the process of the invention are easily soluble in solvents such as tetrahydrofuran, dioxane, dichloroethane, ethyl alcohol and isopropyl alcohol. There are cases where if the content of ethylene oxide is adjusted, the products become soluble in water. Also, the products of invention have excellent adhesion property and film-forming property.

(4) The process of the invention does not require the use of a special metallic compound as a catalyst, and the polymerization in the first step and the esterification in the second step can be carried out by employing a usual catalyst such as alkali metal hydroxides.

(5) In a conventional process for preparing a polyoxyalkylene high molecular weight compound using a special catalyst as mentioned before, there are cases where the metal ions remaining in the product produce undesirable precipitates such as $ZnCO_3$ and $SiSO_4$ upon use in various fields if carbonate ion or sulfate ion is present and the precipitates cause problems. On the other hand, the products of the invention can be used in a wider range, because of not producing such precipitates.

As mentioned above, since the high molecular weight compounds obtained by the process of the present invention have excellent solubility in solvents and film-forming property and moreover do not contain a metal ion such as $Zn^{2+}$ or $Al^{3+}$, they can be used for various purposes, e.g. agent for paper making, water-soluble binder, binder for ceramics, agent for fibers, agent for agricultural use, agent for mining use, thickener and modifier for resins.

The present invention is more specifically described and explained by means of the following Examples, in which all parts and % are by weight unless otherwise noted. It is to be understood that the present invention is not limited to the Examples, and various changes and modifications may be made in the invention without departing from the spirit and scope thereof.

EXAMPLE 1

An autoclave was charged with 106 parts of diethylene glycol and 20 parts of potassium hydroxide flakes. The polymerization of ethylene oxide was carried out at 130° C. and 2 kg./cm.$^2$G, while gradually adding 12,000 parts of ethylene oxide to the autoclave. The polyhydroxyl compound obtained as an intermediate had a weight average molecular weight of about 10,000 which was calculated on the basis of the hydroxyl value and the base number.

To 100 parts of the intermediate was added 1.85 parts of dimethyl terephthalate, and after elevating the temperature to 120° C., methanol was removed under a reduced pressure of 5 mmHg to produce a high molecular weight compound. The weight average molecular weight of the product measured by a high performance liquid chromatography was about 200,000. The solubility of the product was examined by dissolving 5 parts of the product in 95 parts of water, and it was confirmed that the product was completely dissolved in water.

The film-forming property of the product was examined as follows: The product was dissolved in water to give a 10% aqueous solution, 100 g. of the aqueous solution was placed in a laboratory dish having a diameter of 20 cm. and water was evaporated at ordinary temperature to give a film. The properties of the obtained film was measured according to JIS K 6301 with respect to elongation (%), tensile strength (kg./cm.$^2$) and tear strength (kg./cm.).

The results are shown in Table 1.

EXAMPLES 2 TO 15

High molecular weight compounds were prepared in the same manner as in Example 1 except that the organic compound having at least 2 active hydrogen groups (starting material), the alkylene oxide, the amount of potassium hydroxide and the esterifying agent were changed as shown in Table 1. The molecular weight of the intermediates, the molecular weight and presence of the film-forming property of the high molecular weight compounds and the properties of the films prepared form the high molecular weight compounds are shown in Table 1.

The high molecular weight compounds obtained in Examples 2, 8, 14 and 15 were water-swellable, and were not completely soluble in water. However, since they were soluble in tetrahydrofuran, the film formation was conducted by employing tetrahydrofuran as a solvent.

Also, in Table 1, polypropylene glycol used in Example 8 was that having a molecular weight of 1,000, polyethylene glycol used in Example 9 was that having a molecular weight of 2,000, and the polytetramethylene glycol used in Example 14 was that having a molecular weight of 700.

amount of potassium hydroxide and the coupling agent were changed as shown in Table 2. The molecular weight of the intermediates, and the molecular weight, solubility in solvents and presence of the film-forming property of the high molecular weight compounds are shown in Table 2.

In Table 2, the high molecular weight compounds obtained in Comparative Examples 1 to 3 were insoluble in water and THF, and accordingly the measurement of the average molecular weight by high performance liquid chromatography was impossible. Also, since the high molecular weight compounds were not possible to form films (Comparative Examples 1 to 3) or have no film-forming property (Comparative Examples 5 to 7), the properties of the films were not measured.

Also, in Table 2, polyethylene glycol used in Comparative Example 1 was that having a molecular weight of 2,000.

TABLE 1

| Ex. No. | Starting material (part) | Alkylene oxide | | | | Amount (part) | Catalyst KOH (part) | Average molecular weight of intermediate |
| --- | --- | --- | --- | --- | --- | --- | --- | --- |
| | | Ethylene oxide (%) | Propylene oxide (%) | Styrene oxide (%) | Butylene oxide (%) | | | |
| 1 | Diethylene glycol (106) | 100 | — | — | — | 12,000 | 20 | 10,000 |
| 2 | Propylene glycol (76) | 50 | — | — | 50 | 3,100 | 10 | 3,000 |
| 3 | 1,4-Butanediol (90) | 80 | 20 | — | — | 3,000 | 6 | 3,000 |
| 4 | 1,6-Hexanediol (118) | 80 | 20 | — | — | 8,500 | 14 | 8,000 |
| 5 | Bisphenol A (228) | 95 | — | 5 | — | 16,000 | 15 | 15,000 |
| 6 | Ethylene glycol (62) | 90 | 10 | — | — | 4,000 | 5 | 4,000 |
| 7 | Neopentyl glycol (104) | 100 | — | — | — | 16,000 | 10 | 15,000 |
| 8 | Polypropylene glycol (1000) | 55 | 45 | — | — | 26,000 | 7 | 3,500 |
| 9 | Polyethylene glycol (2000) | 100 | — | — | — | 20,000 | 15 | 20,000 |
| 10 | Cyclohexylamine (99) | 80 | 20 | — | — | 5,000 | 7 | 5,000 |
| 11 | Ethylene glycol (62) | 85 | — | — | 15 | 4,100 | 8 | 4,000 |
| 12 | Dipropylene glycol (134) | 70 | 30 | — | — | 5,500 | 10 | 5,000 |
| 13 | 1,6-Hexanediol (118) | 100 | — | — | — | 13,000 | 10 | 12,000 |
| 14 | Polytetramethylene glycol (700) | 35 | 65 | — | — | 2,000 | 7 | 2,000 |
| 15 | Aniline (93) | 40 | 60 | — | — | 2,500 | 6 | 2,000 |

| Ex. No. | Esterifying agent (part/100 parts of intermediate) | Average molecular weight of end product | Presence of film-forming property | Properties of film | | |
| --- | --- | --- | --- | --- | --- | --- |
| | | | | Elongation (%) | Tensile strength (kg./cm$^2$.) | Tear strength (kg./cm.) |
| 1 | Dimethyl terephthalate (1.85) | 200,000 | yes | 10.0 | 150 | 80 |
| 2 | Fumaric acid (3.8) | 23,000 | yes | 2.4 | 30 | 15 |
| 3 | Pyromellitic anhydride (7.6) | 50,000 | yes | 3.5 | 79 | 45 |
| 4 | Dimer acid (6.2) | 80,000 | yes | 9.8 | 120 | 60 |
| 5 | Diethyl adipate (1.1) | 150,000 | yes | 7.3 | 80 | 35 |
| 6 | Maleic anhydride (2.2) | 4,000 | yes | 2.1 | 55 | 25 |
| 7 | Isophthalic acid (1.1) | 120,000 | yes | 18.5 | 135 | 70 |
| 8 | Succinic anhydride (2.8) | 30,000 | yes | 4.5 | 55 | 30 |
| 9 | Dimethyl sebacate (1.1) | 100,000 | yes | 10.3 | 95 | 55 |
| 10 | Trimellitic anhydride (3.7) | 50,000 | yes | 6.2 | 100 | 40 |
| 11 | Dimethyl terephthalate (4.4) | 30,000 | yes | 3.2 | 60 | 30 |
| 12 | Dipropyl succinate (4.0) | 80,000 | yes | 6.5 | 80 | 45 |
| 13 | Adipic acid (1.2) | 200,000 | yes | 25 | 160 | 75 |
| 14 | Pyromellitic acid (8.8) | 22,000 | yes | 3.5 | 35 | 20 |
| 15 | Diethyl maleate (8.3) | 40,000 | yes | 6.2 | 90 | 45 |

COMPARATIVE EXAMPLE 1

A high molecular weight compound was prepared in the same manner as in Example 9 except that 323 parts of bisphenol A diglycidyl ether (commercially available under the commercial name "Epikote 828" made by Shell Kagaku Kabushiki Kaisha) was employed as a coupling agent for combining the intermediary polyhydroxyl compounds instead of the esterifying agent.

The obtained high molecular weight compound was insoluble in water and tetrahydrofuran (THF), and it was impossible to form a film.

COMPARATIVE EXAMPLES 2 TO 6

High molecular weight compounds were prepared in the same manner as in Comparative Example 1 except that the starting material, the alkylene oxide, the

TABLE 2

| Com. Ex. No. | Starting material (part) | Alkylene oxide | | Amount (part) | Catalyst KOH (part) | Average molecular weight of intermediate |
| --- | --- | --- | --- | --- | --- | --- |
| | | Ethylene oxide (%) | Propylene oxide (%) | | | |
| 1 | Polyethylene glycol (2000) | 100 | — | 20,000 | 15 | 20,000 |
| 2 | 1,6-Hexanediol (118) | 80 | 20 | 8,500 | 14 | 3,000 |
| 3 | Dipropylene glycol (134) | 70 | 30 | 5,500 | 10 | 5,000 |
| 4 | Ethylene glycol (62) | 100 | — | 750 | 0.8 | 800 |
| 5 | Cyclohexylamine (99) | 80 | 20 | 410 | 0.5 | 500 |
| 6 | Diethylene glycol (106) | 100 | — | 12,000 | 20 | 10,000 |

TABLE 2-continued

| Com. Ex. No. | Coupling agent (part/100 parts of intermediate) | Average molecular weight of end product | Solubility in solvents | Presence of film-forming property |
|---|---|---|---|---|
| 1 | Epikote 828 (1.5) | — | insoluble | — |
| 2 | Epikote 828 (10.3) | — | insoluble | — |
| 3 | 4,4′-Diphenylmethane diisocyanate (5.0) | — | insoluble | — |
| 4 | Pyromellitic anhydride (28) | 10,000 | soluble | no |
| 5 | Diethyl terephthalate (38) | 8,000 | soluble | no |
| 6 | Succinic anhydride (0.33) | 15,000 | soluble | no |

EXAMPLE 16

In an autoclave, 6.5 parts of a 50% aqueous solution of potassium hydroxide was added to 134 parts of trimethylolpropane. The dehydration was conducted at 120° C. under reduced pressure, and after gradually introducing 1,600 parts of propylene oxide at a pressure of not more than 5 kg./cm.$^2$G, the reaction was conducted. To the obtained reaction mixture was added 43 parts of a 50% aqueous solution of potassium hydroxide, and after conducting the dehydration at 120° C. under reduced pressure, the polymerization of ethylene oxide was conducted, while gradually introducing 30,300 parts of ethylene oxide to the autoclave at a pressure of not more than 5 kg./cm.$^2$G. The polyhydroxyl compound obtained as an intermediate had a weight average molecular weight of about 30,000 which was calculated on the basis of the hydroxyl value and the base number.

To 100 parts of the thus obtained reaction mixture was added 0.46 part of dimethyl maleate, and after elevating the temperature to 120° C., methanol was removed under a reduced pressure of 1 mmHg to produce a high molecular weight compound. The average molecular weight of the product measured by gel permeation chromatography was about 600,000. The solubility of the product was examined by dissolving 5 parts of the product in 95 parts of water, and it was confirmed that the product was completely dissolved in water.

The results are shown in Table 3.

EXAMPLES 17 TO 36

High molecular weight compounds were prepared in the same manner as in Example 16 except that the starting material, the alkylene oxide, the amount of potassium hydroxide and the esterifying agent were changed as shown in Table 3.

The results are shown in Table 3.

The high molecular weight compounds obtained in Examples 31 to 36 were water-swellable and were not completely dissolved in water, but were soluble in tetrahydrofuran. Therefore, the film formation was conducted by employing tetrahydrofuran as a solvent.

In Table 3, the novolak resin used in Example 26 was that having 6 phenol nuclei.

TABLE 3

| Ex. No. | Starting material (part) | Alkylene oxide | | | | | Catalyst KOH (part) | Average molecular weight of intermediate |
|---|---|---|---|---|---|---|---|---|
| | | Ethylene oxide (%) | Propylene oxide (%) | Stylene oxide (%) | Butylene oxide (%) | Amount (part) | | |
| 16 | Trimethylolpropane (134) | 95 | 5 | — | — | 31,900 | 25 | 30,000 |
| 17 | Glycerin (92) | 80 | 20 | — | — | 2,910 | 6 | 3,000 |
| 18 | Pentaerythritol (136) | 80 | 20 | — | — | 6,500 | 13 | 6,000 |
| 19 | Sorbitol (182) | 100 | — | — | — | 13,000 | 13 | 12,000 |
| 20 | Sucrose (342) | 60 | 40 | — | — | 25,000 | 25 | 20,000 |
| 21 | Ethylenediamine (60) | 70 | — | 30 | — | 8,500 | 10 | 8,000 |
| 22 | Polyethyleneimine (1200) | 80 | 20 | — | — | 56,000 | 50 | 50,000 |
| 23 | Sorbitol (182) | 75 | 25 | — | — | 80,000 | 60 | 70,000 |
| 24 | Sucrose (342) | 100 | — | — | — | 8,000 | 7 | 8,000 |
| 25 | Polyethyleneimine (2000) | 85 | — | — | 15 | 12,000 | 20 | 10,000 |
| 26 | Novolak resin (580) | 95 | 5 | — | — | 55,000 | 30 | 50,000 |
| 27 | Diethanolamine (105) | 95 | 5 | — | — | 6,000 | 15 | 6,000 |
| 28 | Tetraethylenepentamine (189) | 75 | 25 | — | — | 15,000 | 20 | 14,000 |
| 29 | Glycerin (92) | 100 | — | — | — | 15,000 | 12 | 15,000 |
| 30 | Dipentaerythritol (254) | 100 | — | — | — | 15,000 | 15 | 15,000 |
| 31 | Sorbitol (182) | 55 | 45 | — | — | 13,000 | 15 | 12,000 |
| 32 | Sucrose (342) | 60 | 40 | — | — | 25,000 | 30 | 20,000 |
| 33 | Polyethyleneimine (1200) | 30 | 70 | — | — | 70,000 | 100 | 50,000 |
| 34 | Glycerin (92) | 75 | 25 | — | — | 3,500 | 4 | 3,000 |
| 35 | Pentaerythritol (136) | 75 | 25 | — | — | 7,000 | 6 | 6,000 |
| 36 | Diethanolamine (105) | 75 | 5 | — | 20 | 6,500 | 6 | 6,000 |
| 37 | Ethylenediamine (60) | 100 | — | — | — | 4,000 | 4 | 4,000 |

| Ex. No. | Esterifying agent (part/100 parts of intermediate) | Average molecular weight of end product | Presence of film-forming property | Properties of film | | |
|---|---|---|---|---|---|---|
| | | | | Elongation (%) | Tensile strength (kg./cm$^2$) | Tear strength (kg./cm.) |
| 16 | Dimethyl maleate (0.46) | 600,000 | yes | 40 | 100 | 35 |
| 17 | Pyromellitic anhydride (7.4) | 80,000 | yes | 20 | 120 | 24 |
| 18 | Dimethyl adipate (3.2) | 100,000 | yes | 30 | 80 | 16 |
| 19 | Dimethyl phthalate (4.9) | 500,000 | yes | 15 | 150 | 30 |
| 20 | Phthalic acid (3.4) | 600,000 | yes | 400 | 170 | 35 |
| 21 | Diethyl sebacate (3.5) | 100,000 | yes | 70 | 130 | 20 |

TABLE 3-continued

| | | | | | | |
|---|---|---|---|---|---|---|
| 22 | Pyromellitic anhydride (29) | 600,000 | yes | 65 | 150 | 40 |
| 23 | Trimellitic anhydride (0.87) | 800,000 | yes | 200 | 180 | 30 |
| 24 | Maleic anhydride (5.8) | 120,000 | yes | 12 | 230 | 35 |
| 25 | Dibutyl succinate (23) | 400,000 | yes | 60 | 230 | 32 |
| 26 | Pyromellitic acid (1.4) | 800,000 | yes | 30 | 310 | 40 |
| 27 | Maleic acid (1.9) | 60,000 | yes | 25 | 75 | 20 |
| 28 | Dimethyl phthalate (2.8) | 700,000 | yes | 250 | 125 | 30 |
| 29 | Trimellitic acid (1.4) | 200,000 | yes | 25 | 100 | 40 |
| 30 | Succinic anhydride (0.74) | 250,000 | yes | 15 | 180 | 50 |
| 31 | Dimethyl phthalate (3.2) | 3,000,000 | yes | 75 | 220 | 78 |
| 32 | Pyromellitic anhydride (3.4) | 2,000,000 | yes | 140 | 170 | 82 |
| 33 | Dimethyl terephthalate (1.9) | 2,500,000 | yes | 470 | 260 | 110 |
| 34 | Sebacic acid (6.7) | 25,000 | yes | 10 | 50 | 30 |
| 35 | Pyromellitic acid (6.6) | 2,000,000 | yes | 600 | 130 | 60 |
| 36 | Dimethyl maleate (2.4) | 1,200,000 | yes | 120 | 180 | 90 |
| 37 | Dimethyl adipate (6.5) | 35,000 | yes | 10 | 70 | 35 |

COMPARATIVE EXAMPLE 7

A high molecular weight compound was prepared in the same manner as in Example 29 except that 210 parts of bisphenol A diglycidyl ether (commerically available under the commercial name "Epikote 828" made by Shell Kagaku Kabushiki Kaisha) was employed as a coupling agent instead of the esterifying agent.

The obtained high molecular weight compound was insoluble in water and tetrahydrofuran (THF), and it was impossible to form a film.

COMPARATIVE EXAMPLES 8 TO 15

High molecular weight compounds were prepared in the same manner as in Comparative Example 7 except that the starting material, the alkylene oxide, the amount of the catalyst and the coupling agent were changed as shown in Table 4. The molecular weight of the intermediates, and the molecular weight, solubility in water and THF and presence of the film-forming property of the high molecular weight compounds are shown in Table 4.

In Table 4, the high molecular weight compounds obtained in Comparative Examples 7 to 10 were insoluble in water and THF, and accordingly the measurement of the average molecular weight by gel permeation chromatography was impossible. For the same reason, they were not subjected to the test for examining the film-forming property. Also, with respect to the products (Comparative Examples 7 to 10) which could not subjected to the test for examiming the film-forming property and the products (Comparative Examples 11 to 13) which had no film-forming property, it was of course impossible to measure the properties of films.

TABLE 4

| Com. Ex. No. | Starting material (part) | Alkylene oxide Ethylene oxide (%) | Alkylene oxide Propylene oxide (%) | Amount (part) | Catalyst KOH (part) | Average molecular weight of intermediate |
|---|---|---|---|---|---|---|
| 7 | Glycerin (92) | 100 | — | 15,000 | 12 | 15,000 |
| 8 | Sorbitol (182) | 85 | 15 | 13,000 | 13 | 12,000 |
| 9 | Sucrose (342) | 60 | 40 | 25,000 | 35 | 20,000 |
| 10 | Triethanolamine (149) | 80 | 20 | 6,500 | 6 | 6,000 |
| 11 | Glycerin (92) | 80 | 20 | 700 | 0.7 | 700 |
| 12 | Sorbitol (182) | 30 | 70 | 700 | 1 | 670 |
| 13 | Ethylene glycol (62) | 100 | — | 800 | 1 | 800 |
| 14 | Sorbitol (182) | — | 100 | 2,020 | 6 | 2,000 |
| 15 | Glycerin (92) | 100 | — | 3,000 | 3 | 3,000 |

| Com. Ex. No. | Coupling agent (part/100 parts of intermediate) | Average molecular weight of end product | Solubility in solvents | Presence of film-forming property | Property of film Elongation (%) | Property of film Tensile strength (kg./cm$^2$.) | Property of film Tear strength (kg./cm.) |
|---|---|---|---|---|---|---|---|
| 7 | Epikote 828 (2.1) | — | soluble | — | — | — | — |
| 8 | Epikote 828 (5.1) | — | soluble | — | — | — | — |
| 9 | 2,4-Tolylene-diisocyanate (2.6) | — | soluble | — | — | — | — |
| 10 | Epikote 828 (5.1) | — | soluble | — | — | — | — |
| 11 | Dimethyl terephthalate (28) | 20,000 | insoluble | no | — | — | — |
| 12 | Dimethyl terephthalate (58) | 30,000 | insoluble | no | — | — | — |
| 13 | Dimethyl terephthalate (36) | 20,000 | insoluble | no | — | — | — |
| 14 | Dimethyl terephthalate (19) | 30,000 | insoluble in water soluble in THF | yes | 2 | 10 | 5 |
| 15 | Pyromellitic anhydride (7.6) | 10,000 | insoluble in water soluble in THF | yes | 0 | 15 | 7 |

In addition to the ingredients used in the Examples, other ingredients can be used in the Examples as set forth in the specification to obtain substantially the same results.

What we claim is:

1. A process for preparing high molecular weight compounds which comprises addition-polymerizing an alkylene oxide containing ethylene oxide to an organic compound having at least two active hydrogens to produce a polyhydroxyl compound having an average molecular weight of not less than 1,000, and reacting said polyhydroxyl compound with an esterifying agent selected from the group consisting of polycarboxylic acids, anhydrides thereof and lower alkyl esters thereof by means of esterification or interesterification reaction at a temperature of 80° to 250° C. under a reduced pressure of 0.001 to 20 mm Hg to chemically bond the molecules of said polyhydroxyl compound to each other, thereby producing a high molecular weight compound which has an average molecular weight of more than 20,000 and is soluble in solvents and moldable.

2. The process of claim 1, wherein said esterifying agent is a member selected from the group consisting of malonic acid, succinic acid, maleic acid, fumaric acid, adipic acid, sebacic acid, phthalic acid, isophthalic acid, terephthalic acid, itaconic acid, trimellitic acid, pyromellitic acid, dimer acid, anhydrides thereof, and monomethyl, dimethyl, monoethyl, diethyl, monopropyl, dipropyl, monobutyl and dibutyl esters thereof.

3. The process of claim 1, wherein said organic compound having at least 2 active hydrogen groups is a member selected from the group consisting of ethylene glycol, diethylene glycol, propylene glycol, dipropylene glycol, 1,4-butanediol, 1,6-hexanediol, neopentyl glycol, bisphenol A, polyethylene glycol, polypropylene glycol, polytetramethylene glycol, aniline, butylamine, octylamine, laurylamine, cyclohexylamine, glycerin, trimethylolpropane, tris(2-hydroxyethyl)isocyanurate, pentaerythritol, diglycerin, dipentaerythritol, sorbitol, sucrose, monoethanolamine, diethanolamine, triethanolamine, isopropanolamine, ethylenediamine, diethylenetriamine, triethylenetetramine, tetraethylenepentamine, polyethyleneimine, tolylenediamine, diaminodiphenylmethane, novolac resin and aniline resin.

4. The process of claim 1, wherein said alkylene oxide is a mixture of alkylene oxides containing at least 30% by weight of ethylene oxide.

5. The process of claim 1, wherein said alkylene oxide is a mixture of alkylene oxides containing at least 50% by weight of ethylene oxide.

6. The process of claim 1, wherein the reaction between the polyhydroxyl compound and the esterifying agent is an interesterification reaction.

7. A polyoxyalkylene compound having an average molecular weight of more than twenty thousand and a film forming property prepared by a process comprising the steps of addition-polymerizing an alkylene oxide containing ethylene oxide to an organic compound having at least two active hydrogens to produce a polyhydroxyl compound having an average molecular weight of not less than 1,000, and reacting said polyhydroxyl compound with an esterifying agent selected from the group consisting of polycarboxylic acids, anhydrides thereof and lower alkyl esters thereof by means of esterification or interesterification reaction at a temperature of 80° to 250° C. under a reduced pressure of 0.001 to 20 mm Hg to chemically bond the molecules of said polyhydroxyl compound to each other, thereby producing a high molecular weight polyoxyalkylene compound.

* * * * *